March 5, 1940.  J. A. J. BENNETT  2,192,492
SUSTAINING OR LIFTING ROTOR FOR AIRCRAFT
Filed March 31, 1938  3 Sheets-Sheet 1

INVENTOR.
James Allan Jamieson Bennett
BY
Synnestvedt & Lechner
ATTORNEYS.

March 5, 1940. J. A. J. BENNETT 2,192,492
SUSTAINING OR LIFTING ROTOR FOR AIRCRAFT
Filed March 31, 1938 3 Sheets-Sheet 2

INVENTOR.
James Allan Jamieson Bennett
BY
Synnestvedt + Lechner
ATTORNEYS.

March 5, 1940.                J. A. J. BENNETT                2,192,492
              SUSTAINING OR LIFTING ROTOR FOR AIRCRAFT
                    Filed March 31, 1938        3 Sheets-Sheet 3
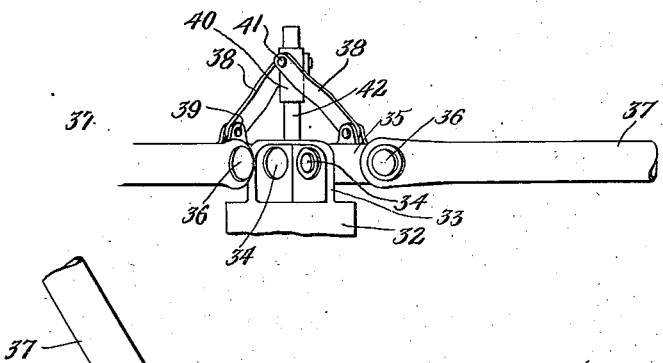
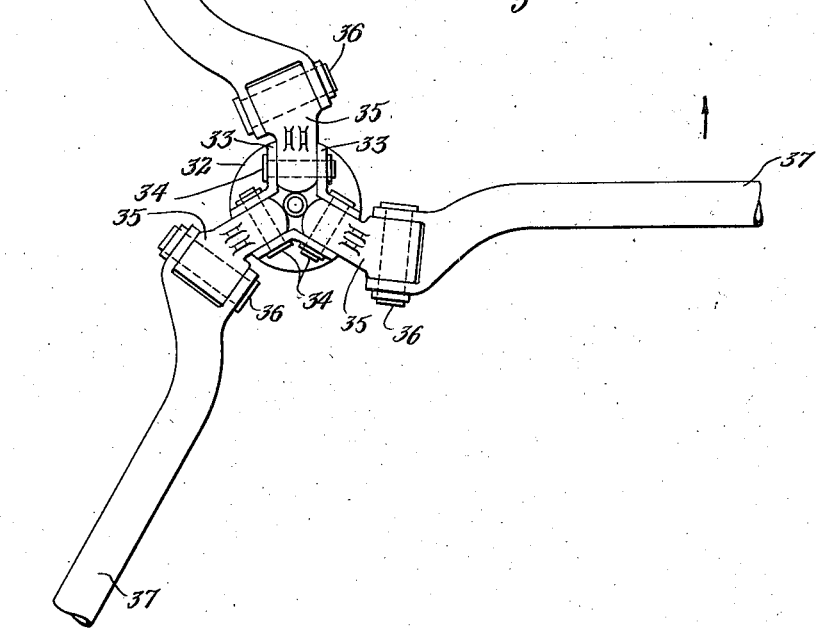
INVENTOR.
James Allan Jamieson Bennett
BY
Synnestvedt & Lechner
ATTORNEYS.

Patented Mar. 5, 1940

2,192,492

UNITED STATES PATENT OFFICE 2,192,492

SUSTAINING OR LIFTING ROTOR FOR AIRCRAFT

James Allan Jamieson Bennett, Esher, England, assignor, by mesne assignments, to Autogiro Company of America, a corporation of Delaware Application March 31, 1938, Serial No. 199,151
In Great Britain April 6, 1937

13 Claims. (Cl. 244—18)

This invention relates to sustaining or lifting rotors for aircraft of the type in which the blade or blades of the rotor are articulated to a generally upright hub for "flapping" movement, i. e. movement in planes generally transverse to the mean rotational plane. The improvements of the invention are applicable to rotors capable of autorotational actuation in flight and/or to rotors adapted to be driven in flight.

Flapping movement of blades of rotors of the types mentioned include components of flapping movement which are differential as between several blades in a multi-bladed rotor, and also components which are non-differential, including especially such as are substantially equal and opposite at opposite sides of the circle of rotation of the blades. The terms differential and non-differential flapping are more rigorously defined hereinafter.

For reasons which will be brought out more fully hereinafter, the present invention contemplates the provision of a compound flapping articulation for each blade incorporating at least two real or virtual pivot axes, one of which accommodates differential flapping movement and the other of which accommodates non-differential flapping movement, the two axes of flapping both preferably being acutely inclined with respect to the longitudinal axis of the blade when viewed in plan, but to different degrees of angularity, so that differential flapping is accompanied by pitch change of the blade in one ratio and non-differential flapping is accompanied by pitch change of the blade in another ratio.

Generally considered, provisions of the foregoing nature are of advantage in improving the smoothness and efficiency of rotor operation, the attainment of these advantages being primary objects of the invention. The manner in which the advantages are secured will be brought out more fully hereinafter following the description of the accompanying drawings illustrating several embodiments of the invention, in which—

Figure 9:
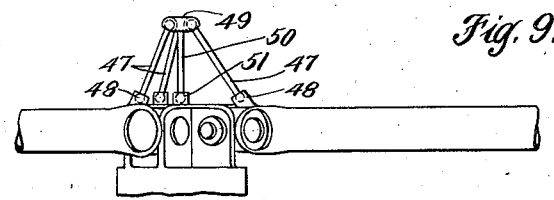
Figure 10:
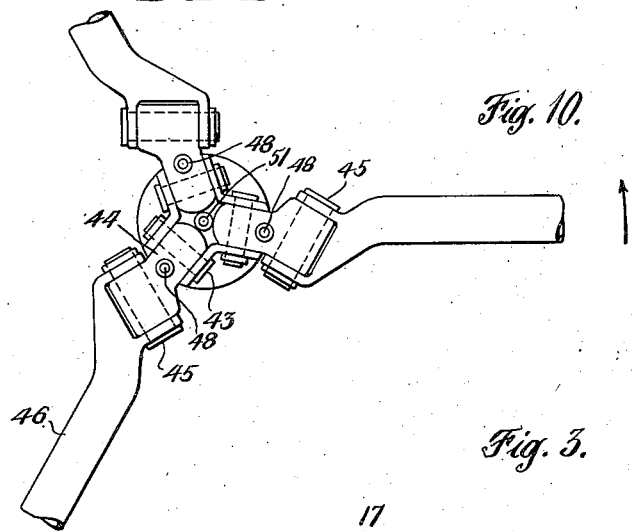

Figures 7 and 8 are side elevational and top plan views of an adaptation of the invention to a three-bladed rotor; and Figures 9 and 10 are views similar to Figures 7 and 8 but showing a modified three-bladed arrangement.

Figure 1:
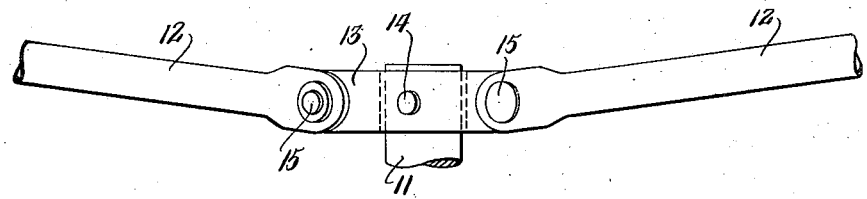
Figure 1 is a side elevational view of a rotor hub and a pair of oppositely disposed blades articulated thereto in accordance with the invention.
Figure 2:
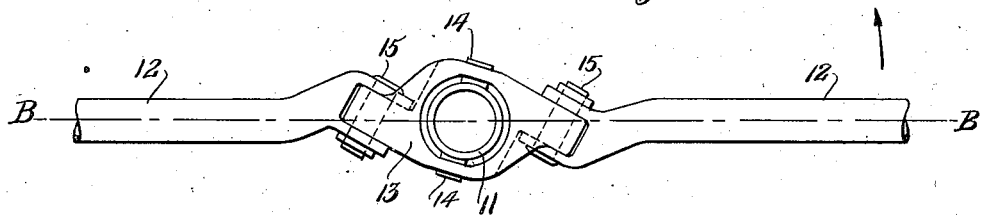
Figure 2 is a top plan view of the mechanism of Figure 1.

Referring first to the form of Figures 1 and 2, a rotor hub appears at 11, the root end portion of two oppositely disposed blade spars being shown at 12—12. The blades are secured to the hub by means of a balance member 13 which is pivoted on the hub 11 by means of trunnions 14—14 constituting a flapping pivot axis for non-differential movement of the two opposite blades, this axis being hereinafter referred to as the beta axis. Each blade is individually articulated to the balance member 12 by means of a pivot 15 providing another flapping axis (for differential flapping), hereinafter referred to as the beta-$b$ axis.

From inspection of Figure 2 it will be seen that both the beta and the beta-$b$ axes are inclined acutely to the radial blade axis B—B at the leading side thereof (the direction of rotation being indicated by the arrow), although the inclination is different as between the two axes.

Before considering the operation and advantages of the foregoing structure, reference is made to the following analysis of flapping motion in a rotor of the type shown If the flapping motion of each blade be analyzed into a Fourier series of harmonic terms, of which the fundamental has a periodicity of once per revolution, the expressions for the flapping of the several blades will be separated by phase angles equal to the angular spacing of the blades, and if the several series representing the flapping of the several blades are added together, those terms the ratio of whose frequency to the fundamental frequency is an integral multiple of the number of blades, are additive, and these terms represent the components of the flapping motion referred to as the "differential flapping". On summing the expressions representing the total flapping of the several blades, all the other terms representing the "non-differential" flapping disappear.

In the case of a two-bladed rotor (Figures 1 to 6), the appropriateness of the expression "differential flapping" is evident as the total flapping motion may be considered as composed of two parts, whereof one, i. e. the non-differential part, would be unaffected if the two oppositely mounted blades were rigidly united at their roots, being mounted on a common flapping pivot, and the other, i. e. the differential part, involves relative displacements of the two opposite blades; and it will easily be seen that the latter ("scissor-like") oscillations of the blades will have frequencies which are even-numbered multiples of the fundamental frequency, whereas the "see-saw" like parts of the flapping oscillations, in which there is no relative displacement of the opposite blades, have frequencies which are odd-numbered multiplies of the fundamental frequency.

The arrangement of Figures 1 and 2 (and also of the other forms described hereinafter) provides mechanical means for separating the differential and/or "coning" components of blade oscillation from the non-differential components of the flapping motion, and for causing the differential and/or coning components to be accompanied by variations of pitch angle which differ in their correlation with the component motions they accompany from the variations of pitch angle, if any, which accompany the non-differential components of the flapping motion.

It will be seen that a variation of the coning angle of the blades involves differential movements of the blades relatively to one another of exactly the same kind as occur in the differential flapping, and these components are therefore alike distinguished from the non-differential components of the flapping motion in which the blades of a rotor with an even number of blades behave as if rigidly connected, and the blades of a rotor with an odd number of blades behave in an analogous manner.

For the purposes of mechanical analysis, the "coning" and "differential" components of the flapping angle are therefore identical, but for the purposes of analyzing the motion of the blade it may be convenient to separate the differential flapping from variations of the "coning" angle which in its primary meaning is the non-periodic component of the flapping angle of the blade.

The frequencies of the (periodic) differential components of the flapping motion are integral multiples of the product, i. e. (revolutions per second of the rotor) X (the number of blades), so that "variation of coning angle" may be considered to include any terms that might be present in the differential motion of the blades and which are not strictly aperiodic but have frequencies less than the revolutions per second.

The pivot arrangement of this invention, as shown by way of example in Figure 1, provides improvement of the general qualities of the rotor in flight in respect to matters which may conveniently be classified in two grops. The first of these groups includes especially "bump-riding", i. e. behavior of the rotor in gusty air, performance, especially maintenance of aerodynamic efficiency, at high altitude, and improvement of aerodynamic efficiency, at high altitude, and improvement of aerodynamic efficiency at the high speed end of the flight-speed-range and, in the case of a normally autorotative rotor adapted for the so-called "jump-start" or direct take-off (in which the excess kinetic energy stored in the rotor when over-speeded is utilized to provide a temporary direct lift, with the drive disconnected) an improved utilization of the available kinetic energy.

The second group comprises the aspects of rotor behavior depending on what may be termed the "lift-vector-shift" characteristic, i. e. the manner in which the position and inclination of the resultant aero dynamic reaction of the whole rotor varies with variation of the angle of incidence and lateral inclination of the rotor disc. On the lift-vector-shift characteristic depend the qualities of the rotor with respect to stability and control.

It has been found that the qualities of the rotor in both the above groups are favorably affected by correlation between the pitch angle and the flapping angle such that the pitch angle decreases with increase of flapping angle but that the optimum correlations for the various qualities are not the same. However, the lift-vector-shift characteristic is only affected by variation of pitch angle accompanying non-differential flapping, and more particularly the "first order" flapping represented by the "fundamental" term of the Fourier series, and the qualities in the first group are only affected by variation of pitch angle accompanying variation of coning angle, so that the use of a mechanism incorporating two flapping pivots arranged as described above, mechanically analyzes the flapping motion and separates the non-differential and the other components thereof, thus enabling the non-differential flapping to be associated with a variation of pitch angle giving the optimum correlation with respect to the lift-vector-shift characteristic, and variations of coning angle to be associated at the same time with a variation of pitch angle giving the optimum correlation in respect of any one of the qualities in the first group. The optimum correlations of pitch angle and coning angle for the various qualities in the first group are about the same, or at least not so different that a satisfactory comprise cannot be achieved. Of the qualities in the first group, that referred to as "bump-riding" is probably the most important and if the variation of pitch angle with coning angle is given the optimum correlation with respect to bump-riding, the other qualities in the first group would at least be favorably affected.

Since, as noted above, the optimum correlation of pitch angle and flapping angle with respect to the qualities of both the first and second groups referred to require a decrease of pitch angle on upward flapping, both the beta 14—14 and the beta-b 15 axes in the arrangement described, are inclined at an acute angle to the radial blade axis at the leading side of the latter. However, since the optimum correlation or bump-riding quality requires a greater decrease of pitch angle for a given increment of upward flapping angle (in this case the coning angle) than is required by the optimum correlation between pitch angle and upward flapping angle (in this case non-differential flapping) with respect to the lift-vector-shift characteristic, in the arrangement of Figures 1 and 2, and also in others described hereinafter, the beta-b 15 axis is more acutely inclined with respect to the longitudinal blade axis, than is the beta axis 14—14. As will clearly be seen from inspection of Figures 1 and 2, differential flapping or coning can only be accommodated by oscillation of the blades about the beta-b pivots 15. An analysis of the arrangement will further show that non-differential flapping must take place about the beta pivot 14—14 since, if the blade displacements about the beta-b pivots 15 included a non-differential component, the balance member 13 would be subjected to a couple of centrifugal origin tending to rock it about the beta pivot 14—14, so that in consequence non-differential flapping movements are entirely accommodated by rocking of the balance member 13 about the beta pivot 14—14.

The existence of a centrifugal moment compelling non-differential flapping to take place about the beta pivot depends on the fact that the beta-*b* pivots do not intersect the axis of rotation but are offset from it, as appears in Figure 2.

Figure 3:
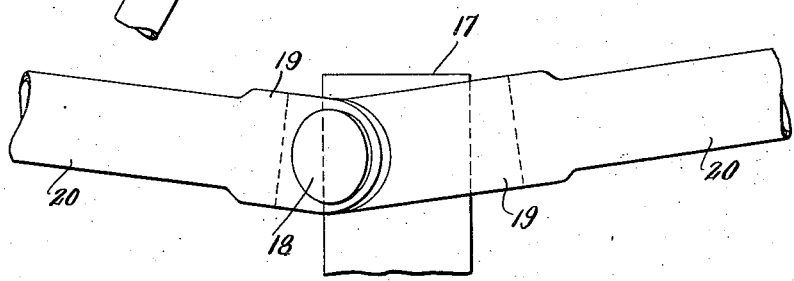
Figures 3 and 4 are views similar to Figures 1 and 2 but illustrating a modification.
Figure 4:
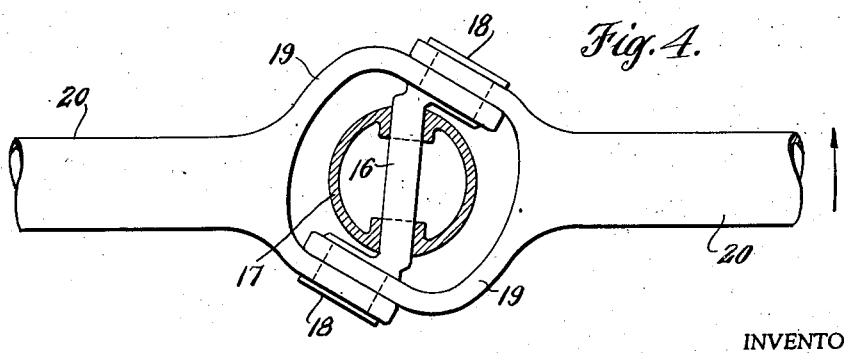

Figures 3 and 4 show a modification similar in essentials to that of Figures 1 and 2, but wherein the beta-*b* pivots are not offset, but are coincident and intersect the upright axis of the hub. In this arrangement the balance member takes the form of a crank 16 rotatably mounted in the hub 17 and constituting the beta pivot, two coaxial trunnions 18—18 on which the forks 19—19 of the blades 20—20 are mounted, constituting the beta-*b* pivot.

As in the arrangement of Figures 1 and 2, differential flapping can only take place by movement of the blade roots on the beta-*b* pivot 18—18, but it will be noted that there is no offset effect to prevent non-differential flapping from taking place about either the beta or the beta-*b* pivot. In the arrangement of Figures 3 and 4, however, the fact that the bearings supporting the blade roots on the trunnions 18—18 are subjected to loading under the influence of centrifugal force, causes the friction therein to be much higher than that in the bearings supporting the balance member 16 in the hub 17 (the bearings in the hub not being subjected to centrifugal force). The excess friction in the beta-*b* pivots 18—18 causes the non-differential flapping movements to be accommodated entirely by the beta pivot.

This differential friction effect is also present in the embodiment of Figures 1 and 2, in which it supplements the action of the offsetting of the beta-*b* pivot axes.

Figure 5:
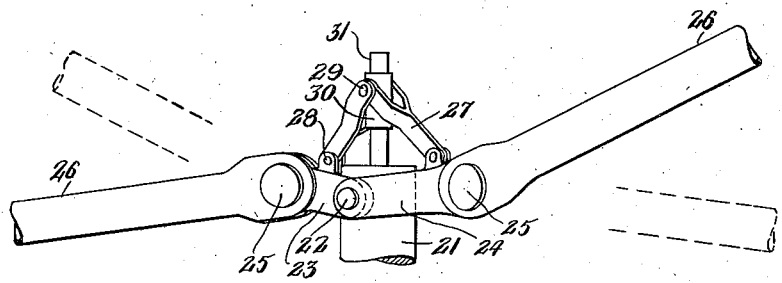
Figures 5 and 6 are also views similar to Figures 1 and 2 but showing a further modification.
Figure 6:
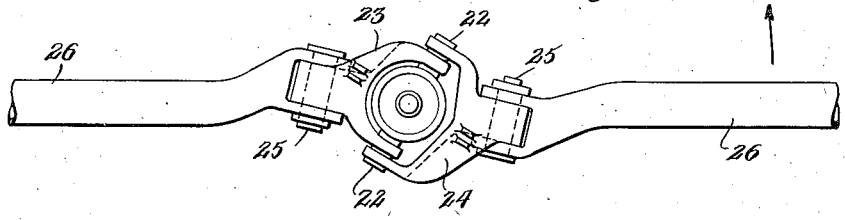

Figures 5 and 6 show an alternative embodiment in which the beta pivots for the blades are separate and offset from the axis of the hub, the beta-*b* pivots being coincident and intersecting the axis of the hub. Here the hub 21 carries a pair of aligned trunnions 22—22 on which are pivoted a pair of independent forks 23 and 24 carrying pivots 25 to which are articulated the forked roots of the blade spars 26. A link 27 for each blade is pivoted at 28 to the respective blade forks 23 and 24, the upper ends of the links being pivotally connected at 29 to a sleeve 30 which is slidably mounted on a post 31 extended upwardly from the hub 21. The constraint introduced by the linkage (27 to 31 inclusive) prevents non-differential flapping from taking place about the pivots 22—22, so that all non-differential flapping is compelled to take place about the pivots 25. The latter pivots therefore constitute the beta pivots in this form, and it will be noted that these are inclined at the same angle to the blade axis as the pivots 14—14 in Figures 1 and 2. On the other hand, in the arrangement of Figures 5 and 6, the pivots 22—22 constitute coincident beta-*b* pivots, the axis of which has the same inclination to the blade axis as the axes of the pivots 15 in Figures 1 and 2.

In the arrangement of Figures 5 and 6, differential flapping (or coning) is effectively prevented from being accommodated by the beta pivots 25 by offsetting the latter from the axis of the hub, so that any differential displacement about pivots 25 will give rise to couples of centrifugal origin tending to rotate the forks 23 and 24 about their pivots 22—22, and insofar as the rotations of the several blades are equal and of the same magnitude, they will not be resisted by the linkages 27 to 31 which cooperate with the offsets of pivots 25 from the hub axis to transfer differential movements to the beta-*b* pivots 22—22.

The arrangements described above are applicable to forms of rotors employing pairs of oppositely disposed blades, although the invention is equally applicable to rotors having more than two blades, in which event, however, the pivot mechanism takes a different form.

In Figures 7 and 8 the hub 32 is provided with three pairs of lugs 33 supporting pivot pins 34 on which are pivoted blade root connecting members 35 carrying pivots 36 on which the fork roots of the blade spars 37 are mounted.

As in the arrangement of Figures 5 and 6, the intermediate members 35 for the several blades are interconnected by linkage comprising links 38 pivoted to the members 35 at 39 and to a sleeve 40 at 41. The axes of the pivots 41 associated with the several blades are not coincident, being parallel respectively to the corresponding pivot axes 39 at the lower ends of links 38. The axes 41 are, however, concurrent on the axis of the hub, and as before, the sleeve 40 is slidable on an extension 42 projecting upwardly from the hub 32.

The operation of this arrangement is similar to that of the arrangement illustrated in Figures 5 and 6 and need not be further described in detail. It may be noted, however, that as in the arrangement of Figures 5 and 6, the pivots 34 connecting the intermediate members 35 with the hub constitute the beta-b pivots, being compelled to accommodate only differential flapping or coning because of the restraint imposed by the linkage just described, and the pivots 36 constitute the beta pivots, the respective inclinations of the pivots 34 and 36 to the radial axes of the blades being accordingly different, in a manner similar to the corresponding pivot axes 22 and 25 in Figures 5 and 6.

Turning now to the embodiment of Figures 9 and 10, it may be noted that the mechanism here shown as applied to a three-bladed rotor is analogous to the mechanism applied to a two-bladed rotor in accordance with Figures 1 and 2.

Structurally, many of the parts shown in Figures 9 and 10 are similar to those of Figures 7 and 8. One important difference between these two forms, however, is the fact that the pivot 43 joining the intermediate member 44 to the hub constitutes the beta pivot, whereas the pivot 45 interconnecting the blade 46 and the intermediate member 44 constitutes the beta-*b* pivot. In this case, however, the linkage takes a different form, being the mechanical equivalent of a swash plate interconnecting the intermediate members 44 for the three blades, so that the intermediate members can only execute non-differential movements about their pivots 43 (beta).

The linkage includes links 47 the lower ends of which are ball jointed as at 48 to the intermediate members and the upper ends of which are similarly connected to a swash member 49 which is rigidly mounted at the upper end of an upright 50, carried at its lower end on the hub as by ball joint 51.

It will be seen that the assemblage of links 47 and 50 constitutes a space frame effectively restraining the intermediate members 44 against differential flapping on the pivots 43. As before (but conversely) the linkages 47 and 50 cooperate with the offsets of the pivots 45 (beta-*b*) from the hub axis to transfer non-differential movements of the blades to the pivots 43 (beta).

The form of construction shown in Figs. 7 and 8 can be applied to a rotor having more than three blades and its operation will be as described, whatever the number of blades, the beta-$b$ pivots 34 being compelled to accommodate only the differential and coning components of the flapping motion, all other components, which are included by definition in the term non-differential, being accommodated on the beta pivots 36.

The form of construction shown in Figs. 9 and 10 can also be applied to rotors with more than three blades, but in such cases it must be understood that the beta pivots 43 will only accommodate some of the non-differential components, the characteristic of the swash-plate mechanism being that it compels the intermediate members 44 to remain coplanar or parallel to the same plane (which is of course not fixed in space) and thus imposes a partial restraint on the inner or beta pivots 43, so that they only accommodate components of the flapping motion whose frequencies per revolution are of the form $(np \pm 1)$, where $n$ is the number of blades and $p$ is zero or an integer. Non-differential components, whose frequencies are of the form $(np+q)$, where $q$ is any positive integer other than $$1 \text{ or } \overline{n-1}$$

as well as the differential components, whose frequencies are of the form $(np)$, must therefore be accommodated on the beta-$b$ pivots 45. However, this is of small importance in practice, as the non-differential components of higher order than the fundamental ($p=0$, $q=1$) hardly require to be seriously considered, the behaviour of the rotor in respect of "lift-vector-shift" characteristic being mainly dependent on the variation of pitch angle which accompanies the fundamental component of non-differential flapping.

It will be seen that in a three-bladed rotor, as well as in a two-bladed rotor, $q$ can only have the value $$1 \text{ or } \overline{n-1}$$

so that all the non-differential components have frequencies of the form $(np \pm 1)$, showing that the swash-plate mechanism of Figs. 9 and 10, and similarly that of Figs. 1 and 2, strictly analyse the flapping motion into its non-differential and differential components causing them to be accompanied respectively by different relative variations of pitch angle. If more than three blades are provided, however, non-differential components having frequencies showing values of $q$ other than $$1 \text{ or } \overline{n-1}$$

are present and these are necessarily accommodated on the beta-$b$ pivots along with the differential and coning components of the motion.

In accordance with the foregoing, different components of flapping motion of sustaining rotor blades are assigned to different pivots, the axes of which are angled with respect to the longitudinal blade axis in a manner to produce pitch change in different ratios for the two components. The several advantages hereinbefore discussed, especially improvement in the efficiency and smoothness of operation, are thereby attained.

The foregoing is accomplished moreover by the use of mechanism which is relatively simple as to structure, even in rotors having more than two blades.

It will be understood that other blade articulations may be employed in combination with those specifically discussed above, such, for example, as a drag pivot providing for lag and lead oscillation of the blade.

In conclusion, it is noted that for clarity and briefness in the claims, the term "flapping pivot" is used therein to define a pivot the major or primary component of movement about which is in the flapping sense, i. e. in a direction transverse to a plane perpendicular to the axis of the hub. It may further be noted that the expressions "differential" and "non-differential", as used in the appended claims in connection with the definition of flapping or of flapping pivots, refer, respectively, to components of flapping motion falling within the two general classes hereinbefore fully identified, the differential taking place about the beta-$b$ pivots and the non-differential taking place about the beta pivots.

I claim:

1. In a multi-bladed aircraft sustaining rotor having a hub, pivot mechanism for connecting the blades with the hub including for each blade two flapping pivots the axes of which when viewed in plan, are acutely but differently angled with respect to the longitudinal axis of the blade at the leading edge of the latter, and means constraining the blades to flap differentially about one of said axes and non-differentially about the other of said axes.

2. In a multi-bladed aircraft sustaining rotor having a hub, pivot mechanism for connecting the blades with the hub including for each blade two flapping pivots the axes of which when viewed in plan, are acutely but differently angled with respect to the longitudinal axis of the blade at the leading edge of the latter, and means for constraining the blades to flap differentially about the axis forming the more acute angle with the longitudinal blade axis and to flap non-differentially about the other of said axes.

3. In a bladed aircraft sustaining rotor having a hub, pivot mechanism for connecting a blade with the hub including at least two flapping pivots the axes of which, when viewed in plan, are acutely but differently angled with respect to the longitudinal axis of the blade at the leading edge thereof, each of said pivots providing freedom for blade flapping movements both above and below the mean rotational path of blade travel.

4. In a bladed aircraft sustaining rotor having a hub, pivot mechanism for connecting the blade with the hub including at least two flapping pivots the axes of which, when viewed in plan, are acutely but differently angled with respect to the longitudinal axis of the blade at the leading edge thereof, the pivot bearing for one of said pivots having a greater frictional moment than the pivot bearing for the other of said pivots.

5. In a multi-bladed aircraft sustaining rotor having a hub and a pair of oppositely disposed blades, mechanism for articulating the blades to the hub including a balance member pivoted to the hub on a flapping axis which, when viewed in plan, is acutely angled with respect to the longitudinal axes of the blades at the leading side thereof, and pivot means interconnecting the blades and the balance member providing a flapping pivot axis for each blade which, when viewed in plan, is more acutely angled with respect to the longitudinal axis of the blade at the leading edge thereof.

6. In a multi-bladed aircraft sustaining rotor having a hub and a pair of oppositely disposed blades, mechanism for articulating the blades to the hub including a balance member pivoted to the hub on a flapping axis which, when viewed in plan, is acutely angled with respect to the longitudinal axes of the blades at the leading side thereof, and pivot means interconnecting the blades and the balance member providing a flapping pivot axis for each blade which, when viewed in plan, is more acutely angled with respect to the longitudinal axis of the blade at the leading edge thereof, the second mentioned flapping pivot axis for each blade being offset from the axis of the hub.

7. In a multi-bladed aircraft sustaining rotor having a hub and a pair of oppositely disposed blades, mechanism for articulating the blades to the hub including a balance member pivoted to the hub on a flapping axis which, when viewed in plan, is acutely angled with respect to the longitudinal axes of the blades at the leading side thereof, and pivot means interconnecting the blades and the balance member providing a flapping pivot axis for each blade which when viewed in plan, is more acutely angled with respect to the longitudinal axis of the blade at the leading edge thereof, all of said pivot axes substantially intersecting the axis of the hub.

8. In a multi-bladed aircraft sustaining rotor having a hub and a plurality of blades, pivot mechanism for each blade including an intermediate member pivoted to the hub on a flapping axis which, when viewed in plan makes an acute angle with the longitudinal axis of the blade at the leading side thereof, a second flapping pivot interconnecting the blade and said intermediate member, the axis of the second flapping pivot when viewed in plan also making an acute but different angle with the longitudinal axis of the blade at the leading side thereof, and mechanism interrelating the movement of the several intermediate members.

9. In a multi-bladed aircraft sustaining rotor having a hub and a plurality of blades, pivot mechanism for each blade including an intermediate member pivoted to the hub on a flapping axis which when viewed in plan makes an acute angle with the longitudinal axis of the blade at the leading side thereof, a second flapping pivot interconnecting the blade and said intermediate member, the axis of the second flapping pivot when viewed in plan also making an acute but different angle with the longitudinal axis of the blade at the leading side thereof, the first pivot axis being more acutely angled with respect to the longitudinal blade axis than the second pivot axis, and mechanism constraining the intermediate members for the several blades to flap on the first pivot axis differentially.

10. In a multi-bladed aircraft sustaining rotor having a hub and a plurality of blades, pivot mechanism for each blade including an intermediate member pivoted to the hub on a flapping axis which, when viewed in plan makes an acute angle with the longitudinal axis of the blade at the leading side thereof, a second flapping pivot interconnecting the blade and said intermediate member, the axis of the second flapping pivot when viewed in plan also making an acute but different angle with the longitudinal axis of the blade at the leading side thereof, the second pivot axis being more acutely angled with respect to the longitudinal blade axis than the first pivot axis, and mechanism interrelating the pivotal movement of the intermediate members for the several blades in a sense providing for non-differential flapping thereof.

11. In a multi-bladed aircraft sustaining rotor having a hub, pivot mechanism for connecting the blades with the hub including two flapping pivot axes for each blade, at least one of which, when viewed in plan, is acutely angled with respect to the longitudinal blade axis at the leading side thereof, and means for constraining the blades to flap non-differentially about the other of said pivots.

12. In a multi-bladed aircraft sustaining rotor having a hub, pivot mechanism for articulating the blades to the hub including for each blade an intermediate member pivoted to the hub on a flapping pivot axis which, when viewed in plan, makes an acute angle with respect to the longitudinal axis of the blade at the leading side thereof, a second pivot the axis of which, when viewed in plan, makes a larger acute angle with the longitudinal blade axis at the leading edge thereof, and mechanism constraining the intermediate members to flap differentially about the first pivot axis including a link for each intermediate member pivoted thereto and extended at an angle to a plane perpendicular to the axis of the hub, a device movable axially of the hub, and means pivotally connecting the links with said device.

13. In a multi-bladed aircraft sustaining rotor having a hub, pivot mechanism for articulating the blades to the hub including for each blade an intermediate member pivoted to the hub on a flapping pivot axis which, when viewed in plan, makes an acute angle with respect to the longitudinal axis of the blade at the leading side thereof, a second pivot the axis of which, when viewed in plan, makes a smaller acute angle with the longitudinal blade axis at the leading side thereof, and mechanism constraining the intermediate members to flap non-differentially about the first pivot axis including a link for each intermediate member pivoted thereto and extended at an angle to a plane perpendicular to the axis of the hub, and a swash plate device interconnecting said links and mounted to provide against movement thereof axially of the hub.

JAMES ALLAN JAMIESON BENNETT.